Nov. 15, 1949  L. HORNBOSTEL  2,488,294
WIRE GUIDE
Filed May 29, 1947  3 Sheets-Sheet 1
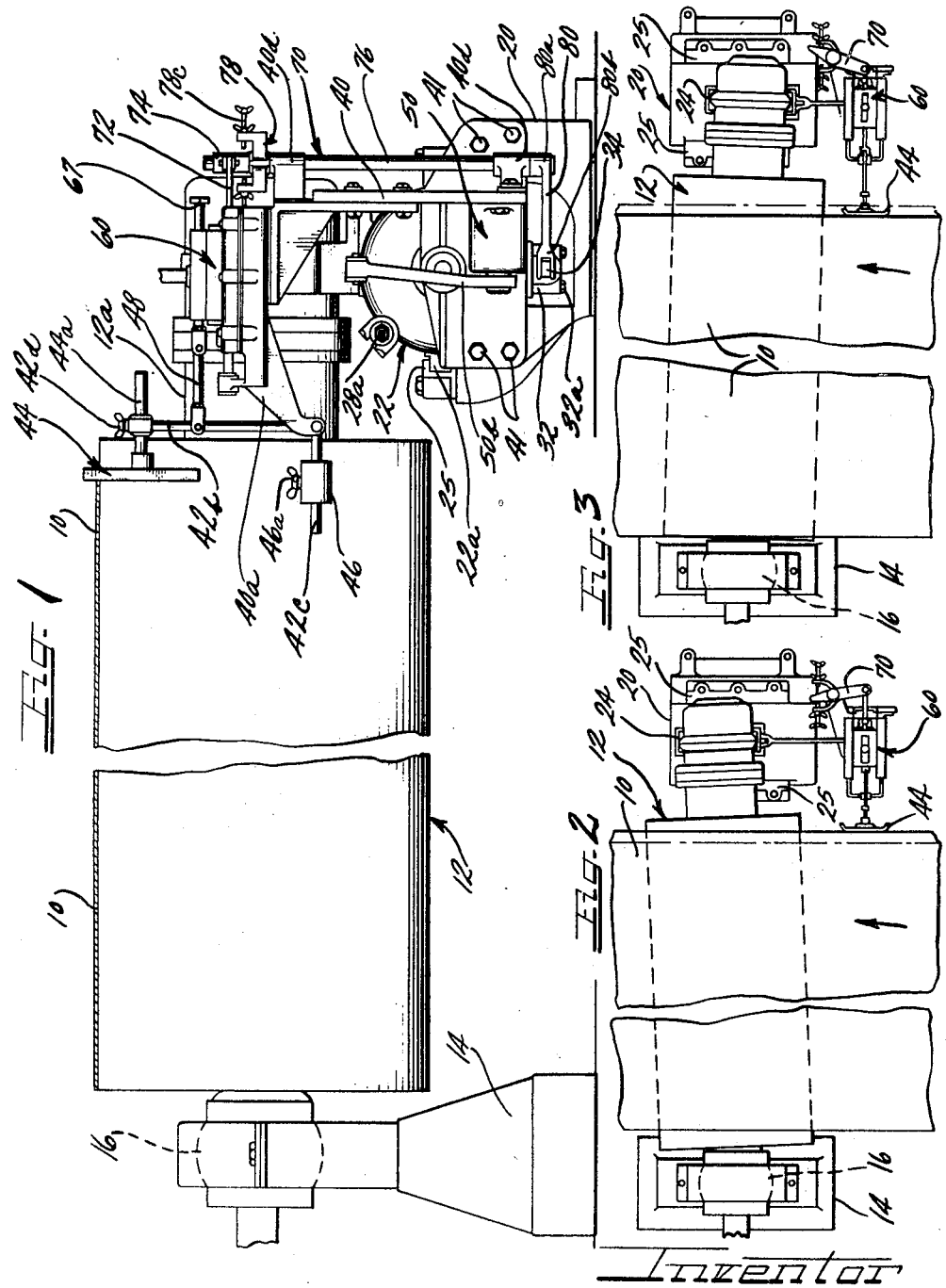
Inventor
LLOYD HORNBOSTEL
by
Attys.

Nov. 15, 1949     L. HORNBOSTEL     2,488,294
WIRE GUIDE

Filed May 29, 1947     3 Sheets-Sheet 2

Inventor
LLOYD HORNBOSTEL

Nov. 15, 1949     L. HORNBOSTEL     2,488,294
WIRE GUIDE

Filed May 29, 1947     3 Sheets-Sheet 3

Inventor
LLOYD HORNBOSTEL

Patented Nov. 15, 1949

2,488,294

UNITED STATES PATENT OFFICE 2,488,294

WIRE GUIDE

Lloyd Hornbostel, Beloit, Wis., assignor to Beloit Iron Works, Beloit, Wis., a corporation of Wisconsin Application May 29, 1947, Serial No. 751,213

10 Claims. (Cl. 74—241)

1

This invention relates to an improved mechanism for maintaining a traveling belt-like element in a predetermined axial position with respect to a supporting roll or rolls. While not limited thereto, this invention has particular application to mechanisms for maintaining the wire or felts of paper-making machines at proper axial positions with respect to the supporting rolls over which such wire or felts are trained.

Many devices of varying degrees of complexity and reliability have heretofore been suggested for the purpose of maintaining a traveling belt-like element in a desired axial position with respect to its supporting roll. The problem is particularly acute in paper-making machinery inasmuch as the wires or felts are of relatively delicate construction and cannot be subjected to any substantial frictional forces by the application of a feeler member thereto by which control mechanism for shifting the roll position of the roll axis with respect to the traveling wire or belt is operated. Furthermore, the supporting rolls are of massive construction and require large forces to effect a shifting thereof to correct the wire or felt position. Known mechanisms for this purpose have all been characterized by the employment of a feeler member requiring a substantial drag to be applied to the edge of the wire or the felt by the feeler or follower member in order to obtain sufficient force to operate the roll shifting mechanism. In the case of guide control mechanisms for Fourdrinier wires, a further problem is involved inasmuch as the edge of such wire generally becomes somewhat frayed by normal usage and hence the axial position of the edge of the wire will cyclically vary through a substantial range due entirely to the frayed condition of the edge. Obviously, it is undesirable that the relatively heavy supporting rolls for the Fourdrinier wire be continuously cyclically shifted to follow the variations of the feeler member induced by the uneven edge of the wire.

Accordingly, it is an object of this invention to provide an improved guide mechanism for controlling the axial position of a belt-like element with respect to a supporting roll, characterized by outstanding simplicity of construction, economy of manufacture and maintenance, and the production of highly accurate control without application of excessive frictional forces to any portion of the belt-like element.

A further object of this invention is to provide an improved guide mechanism for the wires or felts of a paper-making machine wherein the

2 feeler or follower member controlling such mechanism engages the edge of the traveling wire or felt with an unusually light, constant and predetermined frictional force so that wear of the edges of the wire or felt by the action of the position control feeler member is substantially eliminated.

A particular object of this invention is to provide a wire or felt guide mechanism for paper-making machines wherein the movements of a light weight feeler member are greatly amplified in force by a multi-stage fluid pressure control mechanism to effect a shifting of a movable bearing on the wire or felt supporting roll in the proper direction and amount to return the wire or felt to a predetermined, neutral axial position on said roll.

Still another object of this invention is to provide an improved fluid motor construction for use in wire guide mechanism characterized by the fact that such motor will produce identical, amplified force movements of a movable control member, without substantial hunting.

Another object of this invention is to provide a wire guide control mechanism for a paper-making machine which will only respond to variations in wire edge position greater than a predetermined range.

The specific nature of the invention, as well as other objects and advantages thereof, will become apparent to those skilled in the art from the following detailed description of the annexed sheets of drawings which, by way of preferred example only, illustrate one specific embodiment of the invention.

On the drawings:

Figure 1 is a side elevational view of a wire or felt guide mechanism embodying this invention, looking at the mechanism along the path of the traveling wire or felt;

Figures 2 and 3 are reduced scale, top elevational views of the mechanism of Figure 1 showing respectively the positions of the shiftable roll for effecting shifting of the axial position of the traveling wire or felt to the left and to the right;

As shown on the drawings:

Figure 4:
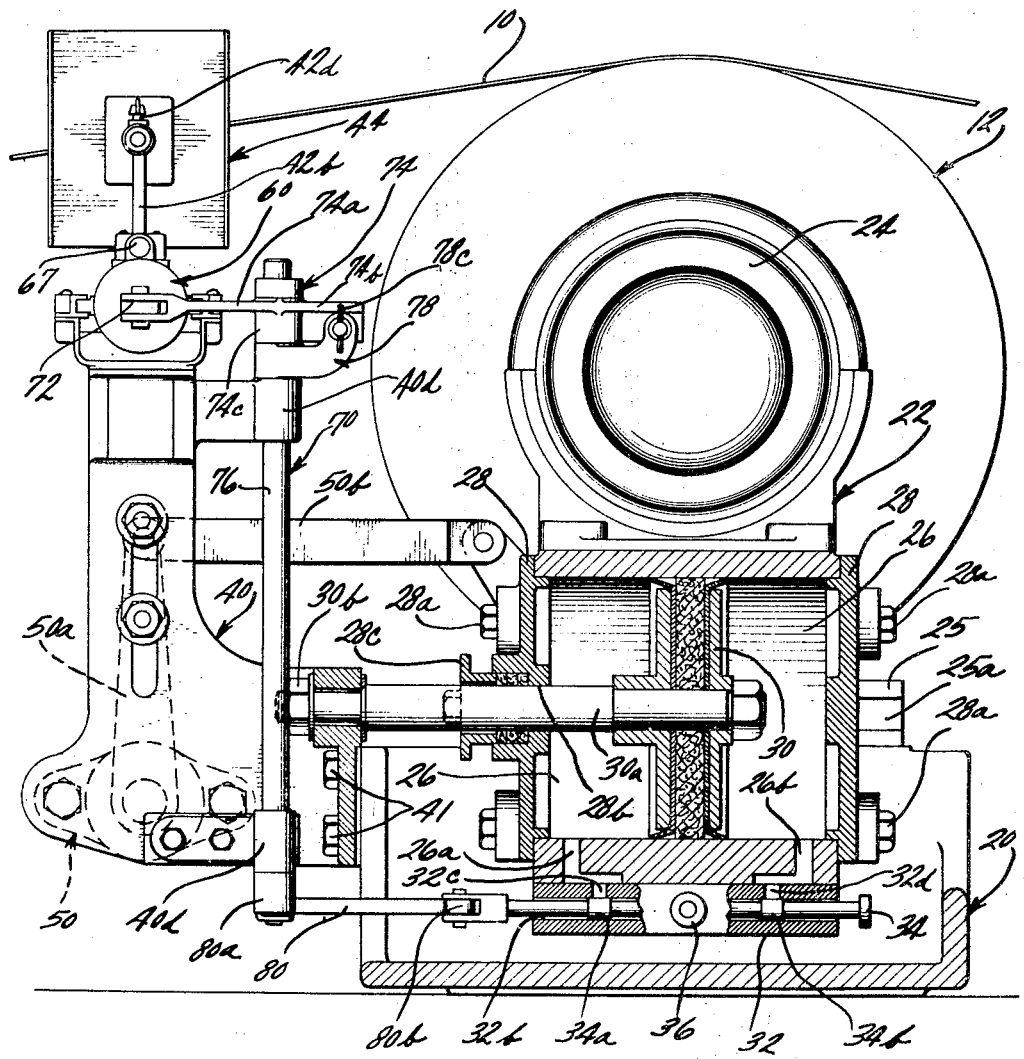
Figure 4 is an enlarged scale front elevational view partly in section, of the mechanism of Figure 1.
Figure 5:
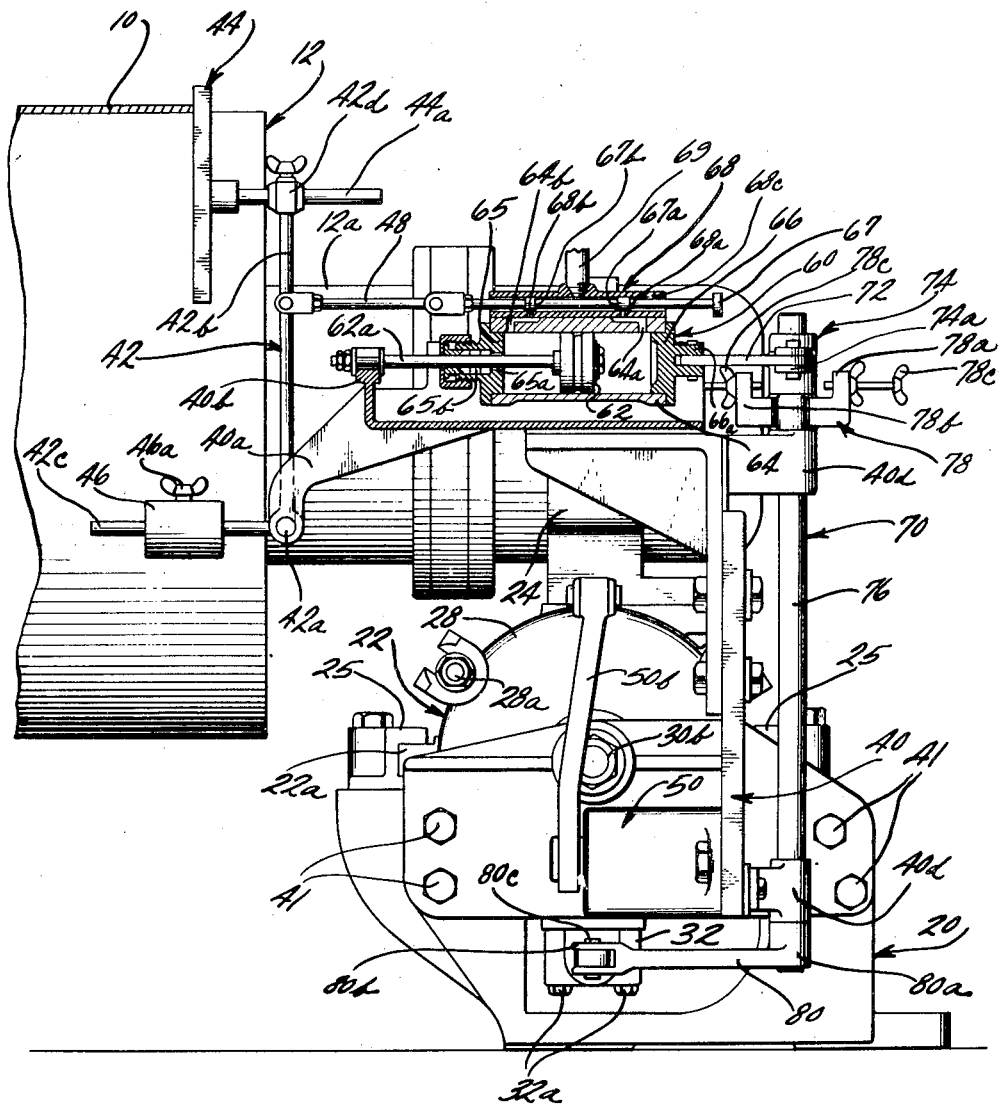
Figure 5 is an enlarged scale elevational view, partly in section, of the right-hand portion of Figure 1.

While the mechanism herein described as exemplary of this invention relates to a wire or felt guide for a paper-making machine, it will be obvious to those skilled in the art that the principles of this invention may be equally applied to any application wherein it is desired to maintain a traveling belt-like element in a predetermined axial position with respect to a supporting roll.

As is customary in paper-making machines, a traveling wire or felt 10 is supported and trained over a plurality of rotatable rolls, one of which may constitute the position control roll 12 shown on the drawings. Roll 12 is supported at one end on a fixed bearing stand 14 through the medium of a universal bearing 16 which will permit the axis of roll 12 to be pivoted in at least one plane with respect to the bearing stand 14. The other end of roll 12 is supported by a shiftable bearing unit comprising a stationary frame structure 20 and a movable bearing support 22. Bearing support 22 carries a universal bearing 24 which journals the shaft 12a of the roll 12.

The stationary bearing frame 20 is of hollow, box-like configuration and is provided with a pair of channel members 25 disposed in spaced, opposed relationship along two of the top walls thereof, which define a pair of tracks 25a extending in a direction generally perpendicular to the axis of the roll 12. The movable bearing frame 22 is provided with a pair of rib-like projections 22a which are respectively receivable in the tracks 25a defined by the channel 25 and hence mount the bearing support 22 for sliding movement with respect to the stationary bearing frame 20.

The bottom portion of movable bearing support 22 defines an open-ended hollow cylindrical chamber 26 (Figure 4). The ends of such chamber are closed by plates 28 secured thereto by bolts 28a so as to define the fluid cylinder of a main fluid motor. A piston 30 is provided to cooperate with cylinder chamber 26. Such piston, however, is stationary, having a rod 30a secured thereto which projects through a central aperture 28b and seal unit 28c in one of the cylinder end plates 28, and is secured to a frame structure 40 by a nut 30b. The frame structure 40 is rigidly secured to one end wall of the stationary bearing frame 20 by bolts 41.

The movable bearing support 22 is also provided with a pair of ports 26a and 26b which open into the cylindrical chamber 26 respectively on opposite sides of the piston 30. A valve housing 32 is secured, as by suitable bolts 32a, to the bottom of movable bearing support 22 in overlying relationship to the ports 26a and 26b. Housing 32 defines a longitudinally extending valve chamber 32b within which a rod-like valve member 34 is slidably received. Generally radial passages 32c and 32d are provided which respectively communicate between the cylinder ports 26a and 26b and the valve chamber 32b. Valve rod 34 is provided with enlarged cylindrical sealing portions 34a and 34b which, in the normal position of the valve rod 34 with respect to cylinder chamber 26, respectively overlie the radial passages 32c and 32d.

That portion of valve chamber 32b which lies intermediate the radial passages 32c and 32d is placed in communication with a suitable source of fluid pressure (not shown) by a fitting 36.

Since both ends of the valve chamber 32b are open to atmosphere, it is apparent that whenever the valve rod 34 is axially shifted in either direction, one of the radial passages 32c or 32d communicating with the cylinder chamber 26 will be placed in fluid communication with the fitting 36 and hence fluid under pressure will be applied to the corresponding side of the piston 30, while the other radial passage will be open to atmosphere. Hence the fluid pressure developed in the cylinder chamber 26 will tend to produce a movement of the movable bearing support 22 with respect to the fixed piston 30 in the same direction as the valve rod 34 was initially shifted. Furthermore, as the movable bearing support 22 moves, it gradually effects a cutoff of the fluid pressure producing such movement so that when the cylinder chamber 26 again attains the normal position with respect to the valve rod 34, the flow of actuating fluid will be completely cut off. Therefore, there will be little tendency of the mechanism to over-shoot and hence to hunt.

Any tendency to hunt may be further reduced by permitting the movement of the movable bearing support 22 to occur only at a slow rate. This may be conveniently accomplished by providing a hydraulic or spring actuated damping mechanism 50. Such mechanism may be conveniently mounted upon frame element 40 and connected to movable bearing support 22 by crank arm 50a and link 50b.

Hence the axis of roll 12 may in effect be pivotally shifted with respect to the path of the traveling wire or felt by the fluid pressure induced movement of the movable bearing support 22 with respect to the fixed piston 30. Thus, as illustrated in Figure 2, the axis of the roll 12 may be pivotally shifted in a counter-clockwise direction to shift the axial position of the traveling wire or felt 10 to the left. Or, as shown in Figure 3, if the movable bearing support 42 is shifted so as to produce a clockwise pivoting of the axis of the roll 12, the axial position of the traveling wire or felt 10 will tend to shift to the right with respect to the roll 12.

Obviously, a form of axial position control for the wire or belt 10 could be established by coordinating the position of the valve rod 34 as a function of the axial position of the wire or felt 10 with respect to the roll 12. However, the piston 30 and cylinder 26 are of substantial size and are operable by moderate fluid pressures. Therefore, the required force to operate the valve rod 34 cannot be directly obtained from the traveling wire or sheet without exerting excessive frictional pressure thereon.

In accordance with this invention, a force amplifying fluid motor is interposed between the valve rod 34 and a feeler or follower member 44 riding on the edge of the traveling wire or felt 10 so that such feeler member may exert a very light frictional force against the wire or felt 10 but the axial movements thereof will nevertheless be sufficiently force amplified to produce corresponding movements of the control rod 34, and hence of the bearing support 22 to produce a shifting of the axis of roll 12.

Thus a frame structure 40 is secured to bearing frame 20 by bolts 41 and is suitably constructed so as to extend adjacent to the path of the traveling wire or felt 10. A pivot bracket 40a is formed at the top of frame 40, and on this bracket a rod-like feeler support frame 42 is pivotally mounted by a transverse pin 42a. Feeler support frame 42 is of angular configuration, pivoted at the vertex, and has one arm thereof 42b extending upwardly adjacent the path of the traveling wire or felt 10. A clamp 42d is suitably secured to the end of the arm 42b and slidably receives the shank 44a of a feeler unit 44. The feeler unit 44 may conveniently comprise a light weight, sheet metal plate of generally rectangular configuration which will ride against the edge of the traveling wire or felt 10 and exert a minimum of frictional force thereon. The frictional force exerted by feeler plate 44 on the traveling wire or felt 10 may be conveniently controlled in accordance with this invention by a weight 46 which is adjustably mounted on the other arm 42c of the feeler support structure 42. Weight 46 may conveniently include a clamp 46a by which the relative displacement of the weight 46 with respect to the pivotal axis of the feeler support structure may be conveniently varied. Hence the pressure with which the feeler plate 44 is urged against the edge of the traveling wire or belt 10 is selectable by positioning of the weight 46.

It should be particularly noted that the utilization of such gravitational bias insures that the frictional engagement of feeler plate 44 with the traveling wire or felt 10 will remain substantially independent of the axial position of such wire or felt with respect to the roll 12. This is a distinct advantage over spring pressed constructions which have been heretofore employed in the art.

A control fluid motor 60 and a linkage 70 are employed to transmit an amplified force movement of feeler plate 44 to the control rod 34 of the shiftable roll bearing unit. The fluid motor 60 may be conveniently supported on the top of frame structure 40 and is functionally identical in construction to the main fluid motor employed for shifting the movable bearing support 22, but obviously is of much smaller size and operates on a substantially lower fluid pressure so that the necessary control forces required for its operation may be conveniently exerted by the axial shifting of the edge of the wire or felt 10 without danger of injury thereto.

Thus the control fluid motor 60 comprises a fixed piston 62 which has the piston rod portion thereof 62a rigidly secured to an upstanding bracket 40b provided on frame structure 40. A cylinder 64 movably cooperates with piston 62 and has the end thereof closed by end blocks 65 and 66 respectively. End block 65 is provided with a suitable aperture 65a and seal 65b to accommodate the piston rod 62a, while end block 66 defines a pivot bracket 66a to which a link 72 of the interconnecting linkage 70 is pivotally secured. Cylinder 64 is provided with fluid ports 64a and 64b respectively disposed on opposite sides of piston 62. A control valve unit 68 is suitably secured to cylinder 64 and defines an elongated valve chamber 68c having radial passages 68a and 68b respectively communicating with cylinder ports 64a and 64b. A valve control rod 67 is slidable within valve chamber 68c and has enlarged portions 67a and 67b respectively co-operating with radial passages 68a and 68b in the normal position of the control rod with respect to the cylinder. A conduit 69 communicates with valve chamber 68c intermediate the radial passages 68a and 68b and supplies low pressure fluid from a suitable source (not shown). Valve control rod 67 is directly shifted by the feeler plate 44 through the medium of a connecting link 48.

The operation of fluid motor 60 is identical to that of the main fluid motor for shifting the movable bearing support 22 and will not be described in detail. It should be particularly noted that any movements of the control rod 67 from its normal position will result in a movement of cylinder 64 in the same direction and of sufficient extent to return the control rod 67 to its normal position with respect to the cylinder 64. Hence the fluid motor 60 will accurately repeat the movements of feeler plate 44 and operate without substantial hunting.

While the linkage 70 interconnecting the fluid motor 60 and the control rod 34 of the main fluid motor may obviously constitute a direct link connection, in accordance with this invention such linkage is preferably constructed so as to embody a lost motion connection therein. Thus the link 72 may pivotally connect the cylinder 64 to one arm 74a of an angle bracket 74. Angle bracket 74 has a central hub portion 74c which is freely rotatably mounted upon a vertical rod 76 journaled in suitable spaced bearing brackets 40d provided on frame structure 40. The other arm 74b of angle bracket 74 projects outwardly between the opposed arms 78a and 78b of a bifurcated bracket 78. The spacing between bifurcated arms 78a and 78b is greater than the thickness of angle bracket arm 74b, hence this construction provides a lost motion connection between such elements. The extent of the lost motion may be conveniently adjusted by thumb screws 78c respectively provided in each of the bifurcated arms 78a and 78b.

Bifurcated bracket 78 is secured to vertical shaft 76 for co-rotation, and hence when the angle bracket 74 is shifted sufficiently to bring one of the angle bracket arms into engagement with one of the thumb screws 78c, the shaft 76 will thereafter be rotated directly with angle bracket 74. At the bottom end of shaft 76 a crank arm 80 is co-rotatably secured thereto by a hub portion 80a, and the other end 80b of the crank is pivotally secured to control rod 34 by a pin 80c.

From the foregoing description it is apparent that whenever the axial position of the traveling wire or felt 10 changes from a desired normal position with respect to the roll 12 (as indicated by the dot-dash line on Figures 2 and 3) such shifting will be duplicated by a movement of the feeler plate 44 and hence of the feeler plate support structure 42. Such movements are directly transmitted to the control rod 67 of fluid motor 60 and the cylinder 64 is actuated by fluid pressure to shift sufficiently to return to its normal position with respect to control rod 67. If such shifting movement of cylinder 64 is sufficiently great to overcome the lost motion connection in the linkage 70, it is transmitted directly to the control rod 34 of the main fluid motor, and hence the bearing support 22 is shifted by fluid pressure to in turn effect a pivoting of the axis of the roll 12 in proper direction to return the traveling wire or felt 10 to the desired neutral position.

It should be particularly noted that the only force which the feeler plate 44 operates against is the relatively light force required to effect a shifting of the control rod 68 of the fluid motor 60. Obviously such force is of such slight magnitude so that the control rod 44 will not injure the edge of the traveling wire or felt 10. Furthermore, due to the lost motion connection incorporated in the linkage 70, variations of the actual position of the edge of the wire or felt 10 over a limited range may be permitted to occur without producing a compensating movement of the main fluid motor and hence of the roll axis. Thus the effects of an uneven edge of the wire or felt 10, produced by fraying or other causes, are eliminated from the wire guide control mechanism and the mechanism responds only to an axial positional shift of the wire or felt edge with respect to the roll 12 which is greater than a predetermined amount. Hence the mechanism operates to maintain the wire or felt 10 within a predetermined range of axial positions on the roll 12.

Those skilled in the art will recognize the advantages of such construction inasmuch as minor variations in axial position of the wire or belt 10 are constantly occurring which in most cases immediately correct themselves. Hence the described construction produces operation of the wire guide control mechanism only when the axial departure of the wire or belt from the desired range of positions on the roll is sufficient to most likely not be self-correcting. There the entire control mechanism, and particularly the bearing elements thereof, are shifted much less frequently than in devices heretofore known, and a substantially greater life of all of the wearing parts thereof may be expected.

It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. In a paper making machine having a rotating roll and a belt-like element trained thereon, shiftable bearing means for journaling said roll, whereby the angular position of the axis of said roll is shiftable with respect to the path of said belt-like element, a feeler member in engagement with an edge of said belt-like element, said feeler member being shiftable by changes in axial position of said belt-like element with respect to said roll, a first reversible fluid motor having a movable output member and a control valve member shiftable by application of small forces thereto, means connecting said feeler to said control valve member to shift said control valve member in response to variations of axial position of the belt-like member with respect to the roll, a second reversible fluid motor having a movable output member and a control valve, means connecting said output member of said first fluid motor to said control valve of said second fluid motor, and means connecting said output member of said second fluid motor to said shiftable bearing means, whereby said bearing means are shifted by movement of said feeler member to maintain said belt-like element in a desired axial position on said roll.

2. In a paper-making machine, a rotating roll adapted to support a traveling wire or the like, shiftable bearing means for said roll at the axial ends thereof permitting adjustment of the roll axis with respect to the path of said wire, a stationary support adjacent the wire path, a feeler plate pivotally secured to said support and adapted to engage the edge of said wire, adjustable means for urging said feeler plate against said wire edge, whereby said plate shifts in position proportionally with axial movements of said wire edge with respect to said roll, a fluid motor for shifting said bearing means, and means controlling said fluid motor in response to movements of said feeler member to maintain said wire in a predetermined range of axial positions on said roll.

3. In a paper-making machine, a rotating roll adapted to support a traveling wire or the like, shiftable bearing means for said roll at the axial ends thereof permitting adjustment of the roll axis with respect to the path of said wire, a stationary support adjacent the wire path, a feeler plate pivotally secured to said support and adapted to engage the edge of said wire, adjustable means for urging said feeler plate against said wire edge, whereby said plate shifts in position proportionally with axial movements of said wire edge with respect to said roll, a fluid motor for shifting said bearing means, and means controlling said fluid motor in response to movements of said feeler member to maintain said wire in a predetermined range of axial positions on said roll, said last mentioned means including a lost motion connection between said feeler member and said fluid motor, whereby axial position variations of said wire within said predetermined range do not produce a shifting of said bearing means.

4. In a paper-making machine, a rotating roll adapted to support a traveling wire or the like, bearing means for said roll including stationary and shiftable elements permitting adjustment of the roll axis relative to the path of the wire, a frame carried by said stationary element of the bearing means, a piston secured to said frame, said shiftable element defining a fluid cylinder co-operating with said piston, fluid supply means for said cylinder including a pair of ports respectively located on opposite sides of said piston, a valve member normally occupying an identical position with respect to both of said ports but movable relative to the cylinder in either direction from said normal position to control fluid flow through said port so as to move said cylinder in the same direction as said valve member, a follower engageable with the edges of said wire and shiftable by axial movement of said wire with respect to said roll, means connecting said follower to said valve member, a second reversible fluid motor having a movable output member and a control valve, means connecting said cylinder of said first fluid motor to said control valve of said second fluid motor whereby said shiftable elements of said bearing means are shifted to maintain said wire in a desired axial position with respect to said roll.

5. In a paper-making machine, a rotating roll adapted to support a traveling wire or the like, shiftable bearing means for said roll permitting adjustment of the roll axis with respect to said wire, a stationary support adjacent the wire path, a feeler plate pivotally secured to said support and adapted to engage the edge of said wire, adjustable means for urging said feeler plate against said wire edge, whereby said plate shifts in position proportionally with axial movements of said wire edge with respect to said roll, a first reversible fluid motor having a movable output member and a control valve member shiftable by application of small forces thereto, means connecting said feeler member to said control valve member to shift said control valve member in response to variations in axial position of the wire with respect to the roll, a second reversible fluid motor having a movable output member and a control valve, means connecting said output member of said first fluid motor to said control valve of said second fluid motor, and means connecting said output member of said second fluid motor to said shiftable bearing means, whereby said bearing means are shifted to maintain said wire at a desired axial position on said roll.

6. The combination defined in claim 5 wherein said means connecting said output member of said first fluid motor to said control valve of said second fluid motor includes a lost motion connection.

7. In a paper-making machine, a rotating roll adapted to support a traveling wire or the like, shiftable bearing means for said roll at the axial ends thereof permitting adjustment of the roll axis with respect to the path of said wire, a stationary support adjacent the wire path, a rod-like member medially pivoted to said support, a feeler plate secured to one end of said rod-like member adapted to move into engagement with the edge of said wire, a weight adjustably secured to the other end of said rod-like member to gravitationally urge said feeler plate against said wire edge with a predetermined force, a fluid motor for shifting said bearing means, and means controlling said fluid motor in response to movements of said feeler plate to maintain said wire in a predetermined axial position on said roll.

8. In a paper-making machine, a rotating roll adapted to support a traveling wire or the like, shiftable bearing means supporting said roll at the ends of the axis of said roll permitting adjustment of the roll axis with respect to the path of said wire, a stationary support adjacent the wire path, a rod-like member medially pivoted to said support, a feeler plate secured to one end of said rod-like member adapted to move into engagement with the edge of said wire, a weight adjustably secured to the other end of said rod-like member to gravitationally urge said feeler plate against said wire edge with a predetermined force, a fluid motor for shifting said bearing means to maintain said wire in a predetermined range of axial positions on said roll, said last-mentioned means including a lost motion connection between said feeler member and said fluid motor, whereby axial position variations of said wire within a predetermined range do not produce a shifting of the bearing means.

9. In a paper-making machine, a rotating roll adapted to support a traveling wire or the like, bearing means for said roll including stationary and shiftable elements permitting adjustment of the roll axis relative to the wire, a frame carried by said stationary elements of the bearing means, a control piston secured to said frame, a control fluid cylinder movably cooperating with said piston, fluid supply means for said control cylinder including a pair of ports respectively located on opposite sides of said control piston, a control valve member normally occupying an identical position with respect to both of said ports but movable relative to the control cylinder in either direction from said normal position to control fluid flow through said ports so as to move said control cylinder in the same direction as said control valve member, thereby returning said control valve member to said normal position with respect to said control cylinder without substantial hunting, a main piston secured to said stationary element of said bearing means, a main fluid cylinder movably cooperating with said main piston, fluid supply means for said main cylinder including a pair of ports respectively located on opposite sides of said main piston, a main valve member normally occupying an identical position with respect to both of said ports and movable relative to the main cylinder in either direction from said normal position to control fluid flow through said ports so as to move said main cylinder in the same direction as said main valve member, thereby returning said main valve member to said normal position with respect to said main cylinder without substantial hunting, said main cylinder being connected to said shiftable element of said bearing means, a linkage connecting said control cylinder to said main valve member, and means for shifting said control valve as a function of the axial position of said wire relative to said roll, whereby said roll is shifted to maintain said wire at a predetermined axial position thereon.

10. The combination defined in claim 9 wherein said linkage includes a lost motion connection, whereby axial shifting of said wire less than a predetermined amount from a normal position does not produce a shifting of said roll.

LLOYD HORNBOSTEL.

REFERENCES CITED

The following references are of record in the file of this patent:

UNITED STATES PATENTS

| Number | Name | Date |
| --- | --- | --- |
| 711,139 | Warren | Oct. 14, 1902 |
| 1,066,687 | Warren | July 8, 1913 |
| 1,339,826 | Hunter | May 11, 1920 |